(12) United States Patent
Callum

(10) Patent No.: US 6,920,513 B2
(45) Date of Patent: Jul. 19, 2005

(54) BUS MANAGEMENT TECHNIQUES

(75) Inventor: Roy Callum, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 205 days.

(21) Appl. No.: 10/306,038

(22) Filed: Nov. 26, 2002

(65) Prior Publication Data
US 2004/0103229 A1 May 27, 2004

(51) Int. Cl.$^7$ ............................................. G06F 13/00
(52) U.S. Cl. ...................................... 710/107; 710/313
(58) Field of Search ............................... 710/107, 305, 710/313, 4, 5, 20; 370/464; 711/100; 702/122; 709/223, 225; 712/28, 200; 718/104

(56) References Cited

U.S. PATENT DOCUMENTS 5,265,228 A * 11/1993 Beaudoin et al. ........... 710/306
5,423,012 A * 6/1995 Sato et al. ................... 712/204
5,938,747 A * 8/1999 Young ........................... 710/53
6,279,051 B1 * 8/2001 Gates et al. ................... 710/20

OTHER PUBLICATIONS

"GASP: A programmable signal processor" by Rogers, J. (abstract only) Publication Date: Apr. 1976.*

"Speculative dynamic vectorization" by Pajuedo, A.; Gonzalez, A.; Valero, M. (abstract only) Publication Date: May 25–29, 2002.*

* cited by examiner

Primary Examiner—Gopal C. Ray
(74) Attorney, Agent, or Firm—Glen R. Choi

(57) ABSTRACT

Techniques to prevent interruption of operations performed by an I/O device. One advantage may be that the I/O device does not need to re-establish its interrupted operation (and waste the associated time to re-establish its interrupted operation). Accordingly, bus utilization efficiency may be improved.

19 Claims, 5 Drawing Sheets

Information transfer controller 310

Task list 320

Mem_head_pointer 325

Mem_tail_pointer 330

Mem_hw_idle 340

Information transfer controller 310

Task list 320

Mem_head_pointer 325

Mem_tail_pointer 330

Mem_hw_idle 340

FIG. 2

I/O information controller 410

HW_head_pointer 415

HW_tail_pointer 420

FIG. 3

BUS MANAGEMENT TECHNIQUES

FIELD

The subject matter disclosed herein generally relates to techniques to manage use of a shared computer bus.

DESCRIPTION OF RELATED ART

FIG. 1 depicts a prior art system that may perform inter-computer information transfers. The system of FIG. 1 includes a personal computer (PC) 100 coupled to communicate with an I/O device 150. PC 100 may include a central processing unit (CPU) 110, memory 120, chipset 130, and bus 140. Bus 140 may utilize Peripheral Component Interconnect (PCI), Ethernet (described for example in IEEE 802.3 and related standards), IEEE 1394, and/or other standards to provide communication between PC 100 and I/O device 150.

I/O device 150 may include at least a microprocessor and memory or hardwired logic. Example implementations of I/O device 150 include but are not limited to an Ethernet interface card, audio card, and/or video card.

Under PCI, use of bus 140 may be scheduled using a circular queue of task descriptors. Under direct memory access (DMA) control, a task descriptor is used to start a bulk data transfer between memory 120 and I/O device 150. However, a direct read or write issued by CPU 110 that calls for use of bus 140 may interrupt bulk data transfers involving I/O device 150. After CPU 110 uses bus 140, the interrupted bulk data transfer may resume. One drawback with such interruption may be that I/O device 150 engages in a time consuming negotiation to access and use bus 140 and memory 120 in order to resume the bulk data transfer.

BRIEF DESCRIPTION OF THE DRAWINGS

FIG. 2 depicts variables and fields that may be used in an embodiment of the present invention.

FIG. 3 depicts variables and fields that may be used in an embodiment of the present invention.

Note that use of the same reference numbers in different figures indicates the same or like elements.

DETAILED DESCRIPTION

Figure 1:
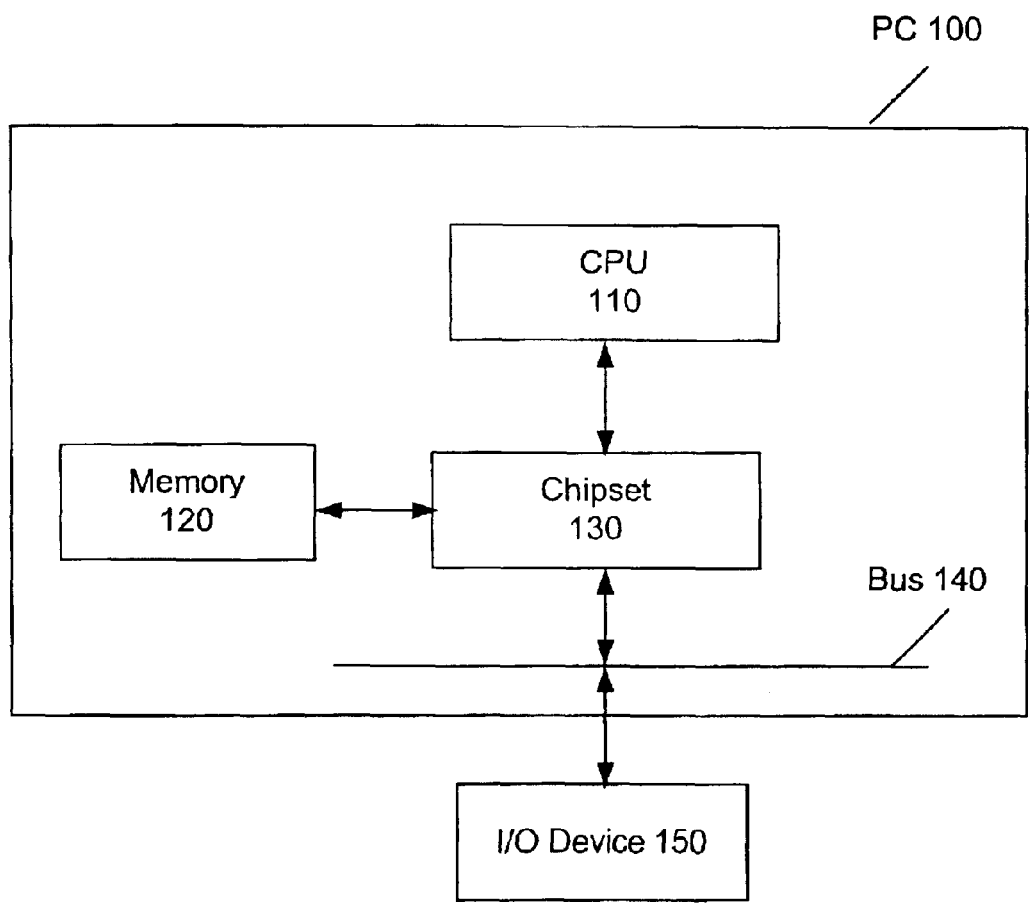
FIG. 1 depicts a prior art system that may perform inter-computer information transfers.

Some embodiments of the present invention include techniques to prevent a CPU from interrupting active direct memory access operations or other operations performed by an I/O device. FIGS. 2 and 3 depict modules and variables that may be utilized in some embodiments of the present invention. Information transfer controller 310 (FIG. 2) and I/O controller 410 (FIG. 3) may prevent CPU 110 from interrupting direct memory access operations or other operations performed by I/O device 150.

In accordance with an embodiment of the present invention, PC 100 may utilize at least the following modules and variables depicted in FIG. 2: information transfer controller 310, a task list 320, variable mem_head_pointer 325, variable mem_tail_pointer 330, and variable mem_hw_idle 340. Task list 320 may store a list of tasks that I/O device 150 performs and/or will perform. Some tasks in task list 320 may relate to use of bus 140 and/or memory 120 (e.g., a bulk data transfer). CPU 110 may utilize information transfer controller 310 prior to adding a task to task list 320.

Variable mem_head_pointer 325 may reference a task within task list 320 that CPU 110 expects I/O device 150 to currently perform. Variable mem_tail_pointer 330 may reference a last task within task list 320 that CPU 110 expects I/O device 150 will perform last. For example, CPU 110 may expect I/O device 150 to perform all the tasks referenced by mem_head_pointer 325 and mem_tail_pointer 330 as well as tasks in task list 320 between tasks referenced by $mem_{13}$ head_pointer 325 and mem_tail_pointer 330. Variable mem_hw_idle 340 may indicate whether I/O device 150 is idle or not idle. For example, I/O device 150 may be "not idle" when performing an operation, such as, but not limited to, transferring/receiving information to/from memory 120 using bus 140. I/O device 150 may be "not idle" when otherwise performing a task that involves bus 140. Variables mem_head_pointer 325 mem_tail_pointer 330, and mem_hw_idle 340 may be stored in memory accessible by PC 100.

In accordance with an embodiment of the present invention, I/O device 150 may utilize at least the following modules and variables depicted in FIG. 3: P/O controller 410, variable HW_head_pointer 415, and variable HW_tail_pointer 420. I/O device 150 may utilize I/O controller 410 to prevent CPU 110 from interrupting operations performed by I/O device 150.

Variable HW_head_pointer 415 may reference a task within task list 320 that I/O device 150 currently performs. Variable HW_tail_pointer 420 may reference a last task within task list 320 that I/O device 150 is to perform. I/O device 150 may perform tasks referenced by HW_head_pointer 415 and HW_tail_pointer 420 as well as tasks in task list 320 between tasks referenced by HW_head_pointer 415 and HW_tail_pointer 420. Variables HW_head_pointer 415 and HW_tail_pointer 420 may be stored in a memory accessible at least by I/O device 150.

Figure 4:
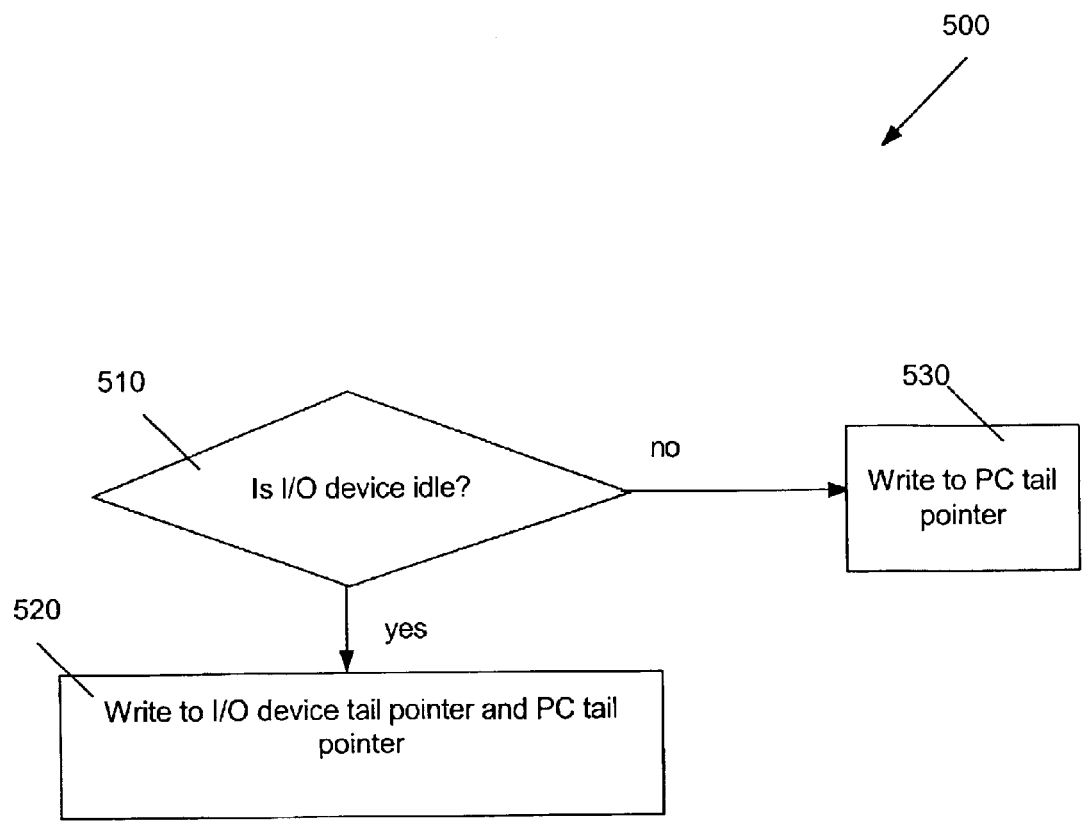
FIG. 4 depicts a flow diagram of one example operation of an information transfer controller in accordance with an embodiment of the present invention.

FIG. 4 depicts a flow diagram 500 of one example implementation of information transfer controller 310 in accordance with an embodiment of the present invention. PC 100 may utilize information transfer controller 310 prior to requesting I/O device 150 to perform a new task. In one implementation, information transfer controller 310 may manage additions of new tasks that relate to information transfers between memory 120 and I/O device 150. PC 100 (or a software program utilized by I/O device 150) may call for execution of information transfer controller 310 prior to PC 100 requesting a new task to be performed by I/O device 150.

Information transfer controller 310 may be implemented as any of or a combination of: hardwired logic, software stored by a memory device and executed by a microprocessor, firmware, an application specific integrated circuit (ASIC), and/or a field programmable gate array (FPGA).

Prior to execution, information transfer controller 310 may initialize some variables utilized by information transfer controller 310. For example, information transfer controller 310 may (1) set variable mem_tail_pointer 330 to point to no task within task list 320 and (2) set variable mem_hw_idle 340 to indicate that I/O device 150 is idle.

After initialization of variable mem_hw_idle 340, I/O device 150 may change the status of variable mem_hw_ idle 340 to indicate that I/O device 150 is not idle. In action 510, information transfer controller 310 may determine whether I/O device 150 is idle. For example, to determine whether I/O device 150 is idle, information transfer controller 310 may read variable mem__hw__idle 340. If I/O device 150 is idle, then action 520 may follow. If I/O device 150 is not idle, then action 530 may follow.

In action 520, information transfer controller 310 may adjust variables mem__tail__pointer 330 and HW__tail__pointer 420 to point to a new task requested by PC 100 for I/O device 150 to perform. For example, in one implementation, information transfer controller 310 may adjust variables mem__tail__pointer 330 and HW__tail__pointer 420 to point to a new task added to task list 320 by PC 100.

In action 530, information transfer controller 310 may adjust variable mem__tail__pointer 330 to point to the new task requested by PC 100 for I/O device 150 to perform. For example, in one implementation, information transfer controller 310 may adjust variable mem__tail__pointer 330 to point to a new task added to task list 320 by PC 100.

Accordingly, when I/O device 150 is not idle, PC 100 may not adjust tasks to be performed by I/O device 150 or otherwise interrupt operation of I/O device 150. Information transfer controller 310 may prevent PC 100 from interrupting a bulk memory transfer operation or other operation performed by I/O device 150.

Figure 5:
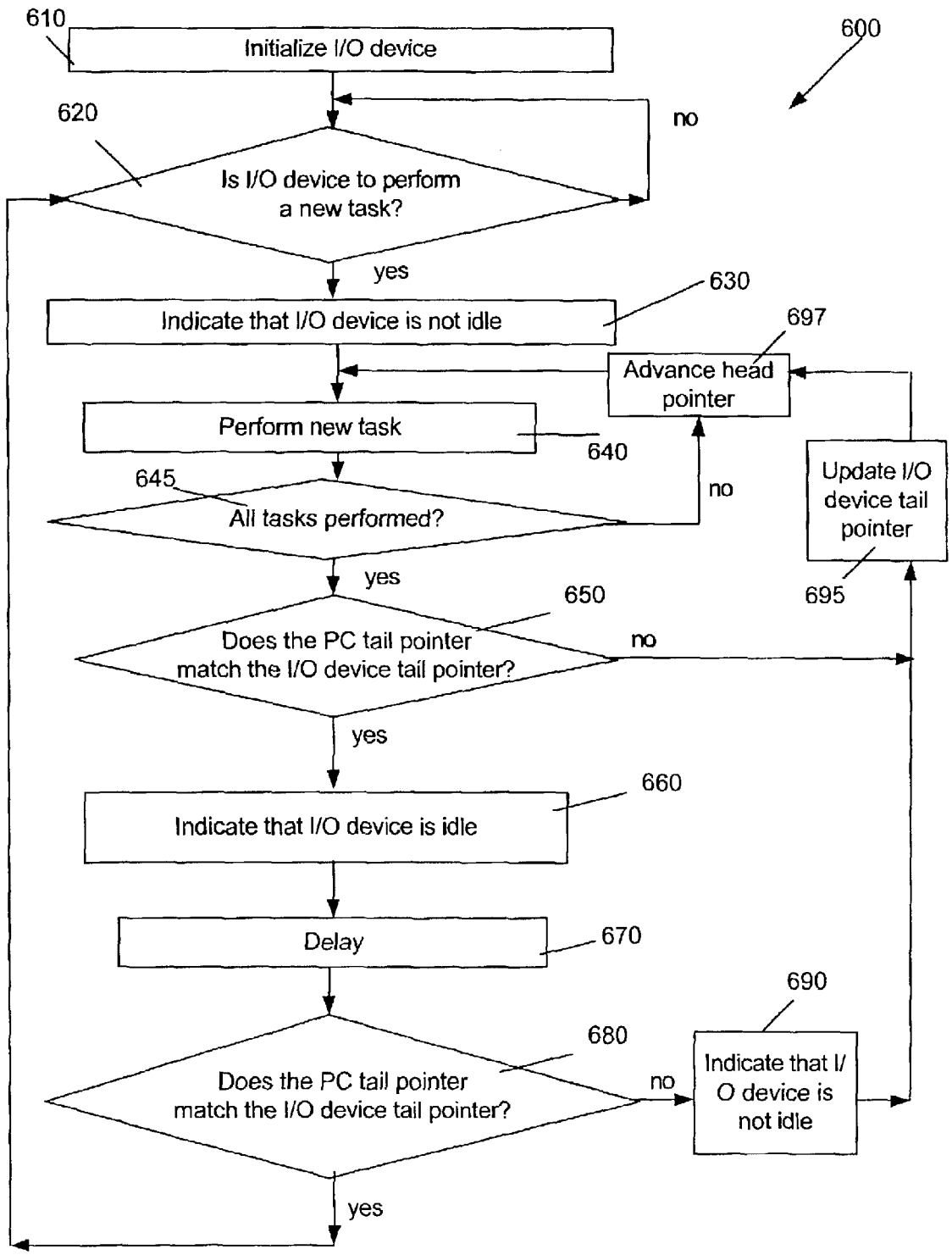
FIG. 5 depicts a flow diagram of one example operation of an I/O controller in accordance with an embodiment of the present invention.

FIG. 5 depicts a flow diagram 600 of one example implementation of the I/O controller 410 in accordance with an embodiment of the present invention. I/O device 150 may utilize I/O controller 410 to manage task assignments. I/O controller 410 may be implemented as any of or a combination of: hardwired logic, software stored by a memory device and executed by a microprocessor, firmware, an application specific integrated circuit (ASIC), and/or a field programmable gate array (FPGA).

In action 610, I/O controller 410 may initialize operation. For example, action 610 may include I/O controller 410 (1) setting variable HW__tail__pointer 420 to point to no task within task list 320 and (2) setting variable mem__hw__idle 340 to indicate that I/O device 150 is idle.

In action 620, I/O controller 410 may wait for a new task to be provided for I/O device 150 to perform. In one implementation, I/O controller 410 may determine a new task is available when variables HW__head__pointer 415 and HW__tail__pointer 420 point to different tasks within task list 320. If a new task is available, action 630 may follow action 620.

In action 630, I/O controller 410 may indicate that I/O device 150 is not idle. For example, in action 630, I/O controller 410 may adjust variable mem__hw__idle 340 to indicate that I/O device 150 is not idle.

In action 640, I/O device 150 may perform a new task identified in action 620. For example, the new task may be the task pointed to by HW__head__pointer 415.

In action 645, I/O controller 410 may determine whether I/O device 150 performed all tasks. For example, I/O device 150 may have performed all tasks if variables HW__head__pointer 415 and HW__tail__pointer 420 point to the same task. If I/O device 150 has performed all tasks, then action 650 may follow. If I/O device 150 has not performed all tasks, then action 697 may follow.

In action 650, I/O controller 410 may determine whether the last task that PC 100 tracks I/O device 150 to perform matches a task that I/O device 150 stores as a last task. For example, in action 650, I/O controller 410 may determine whether variable HW_tail__pointer 420 matches variable mem__tail__pointer 330. If the variables match, then action 660 may follow action 650. If the variables do not match, then action 695 may follow action 650.

In action 660, I/O controller 410 may indicate to PC 100 that I/O device 150 is idle. For example, I/O controller 410 may set variable mem__hw__idle 340 to indicate that I/O device 150 is idle.

In action 670, I/O controller 410 may delay a short period before performing action 680. In action 680, I/O controller 410 may re-perform action 650. For example, I/O controller 410 may determine whether variable HW__tail__pointer 420 points to the same task as that of variable mem__tail__pointer 330. If the variables match, then action 620 may follow action 680. If the variables do not match, then action 690 may follow action 680.

Action 680 may account for situations in which the outcome of action 650 is inaccurate because variable HW__tail__pointer 420 is unsuccessfully attempted to be updated while variables HW__tail__pointer 420 and mem__tail__pointer 330 are compared in action 650.

In action 690, I/O controller 410 may indicate to PC 100 that I/O device 150 is not idle. For example, in action 690, I/O controller 410 may set variable mem__hw__idle 340 to indicate that I/O device 150 is not idle. Action 695 may follow action 690.

In action 695, I/O controller 410 may set variable HW__tail__pointer 420 to point to the same task in task list 320 as that pointed to by mem__tail__pointer 330. Accordingly, a new task attempted to be added by PC 100 when I/O device 150 was not idle may be added in action 695 when I/O device 150 is idle.

In action 697, the I/O controller 410 may adjust variable HW__head__pointer 415 to point to a task after the most recently completed task in task list 320. Action 640 may follow action 697. For example, subsequently, in action 640, I/O device 150 may perform a next task that may be the task identified in action 697.

The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
   selectively determining whether a bus is in use in response to a first command that comprises a request to use the bus;
   selectively associating a first pointer with the first command in response to the bus being in use; and
   selectively associating the first pointer and a second pointer with the first command in response to the bus not being in use.

2. The method of claim 1, wherein the determining whether the bus is in use comprises reading a memory location that indicates whether an I/O device is performing an operation.

3. The method of claim 1, wherein the first pointer indicates a last task that a computer coupled to an I/O device expects the I/O device to perform.

4. The method of claim 1, wherein the second pointer indicates a last task that an I/O device is scheduled to perform.

5. The method of claim 1, wherein an internal memory accessible to a computer stores the first pointer.

6. The method of claim 1, wherein an external memory accessible to an I/O device stores the second pointer.

7. The method of claim 1, further comprising:

when the bus is not in use, selectively associating the second pointer with the first command in response to the first and second pointers not being associated with the same command.

8. An apparatus comprising:

a memory to store a first pointer;

logic circuitry to selectively determine whether a bus is in use in response to a first command that comprises a request to use the bus;

logic circuitry to selectively associate the first pointer with the first command in response to the bus being in use; and logic circuitry to selectively associate the first pointer and a second pointer with the first command in response to the bus not being in use.

9. The apparatus of claim 8, wherein the logic circuitry to determine whether the bus is in use comprises logic circuitry to read a memory location that indicates whether an I/O device is performing an operation.

10. The apparatus of claim 8, wherein the first pointer indicates a last task the I/O device is expected to perform.

11. The apparatus of claim 8, wherein the second pointer indicates a last task that an I/O device is schedule to perform.

12. The apparatus of claim 8, wherein an external memory accessible to an I/O device stores the second pointer.

13. The apparatus of claim 8, further comprising:

logic circuitry to selectively associate the second pointer with the first command when the bus is not in use and in response to the first and second pointers not being associated with the same command.

14. An article comprising a machine readable storage medium to store instructions, that when executed, instruct a machine to:

selectively determine whether a bus is in use in response to a first command that comprises a request to use the bus;

selectively associate first pointer with the first command in response to the bus being in use; and selectively associate the first pointer and a second pointer with the first command in response to the bus not being in use.

15. The article of claim 14, wherein the instruction to determine whether the bus is in use comprises an instruction to read a memory location that indicates whether an I/O device is performing an operation.

16. The article of claim 14, further comprising instructions, that when executed, instruct a machine to:

selectively associate the second pointer with the first command when the bus is not in use and in response to the first and second pointers not being associated with the same command.

17. A system comprising:

a personal computer comprising a processor, memory, bus, and chipset, wherein the chipset is to communicatively couple together the processor, memory, and bus; and an input/output (I/O) device communicatively coupled to the bus and capable to receive and transfer information using the bus, wherein the personal computer comprises:

logic circuitry to selectively determine whether the bus is in use in response to a first command that comprises a request to use the bus, logic circuitry to selectively associate a first pointer with the first command in response to the bus being in use, and logic circuitry to selectively associate the first pointer and a second pointer with the first command in response to the bus not being in use.

18. The system of claim 17, wherein the I/O device comprises:

logic circuitry to selectively associate the second pointer with the first command when the bus is not in use and in response to the first and second pointers not being associated with the same command.

19. The system of claim 17, wherein the bus is compatible with Peripheral Component Interconnect.

* * * * *

UNITED STATES PATENT AND TRADEMARK OFFICE
CERTIFICATE OF CORRECTION

PATENT NO. : 6,920,513 B2
DATED : July 19, 2005
INVENTOR(S) : Callum

It is certified that error appears in the above-identified patent and that said Letters Patent is hereby corrected as shown below:

Column 2,
Line 15, delete "$mem_{13}$" and insert -- $mem\_$ --.
Line 27, delete "P/O" and insert -- I/O --.

Signed and Sealed this

Sixth Day of September, 2005

JON W. DUDAS
*Director of the United States Patent and Trademark Office*